July 9, 1946.  E. J. BOURGEOIS  2,403,494
REAR HUB AND AXLE ASSEMBLY FOR FLOATING AXLES
Filed May 6, 1944
Fig. 1.
Fig. 2.
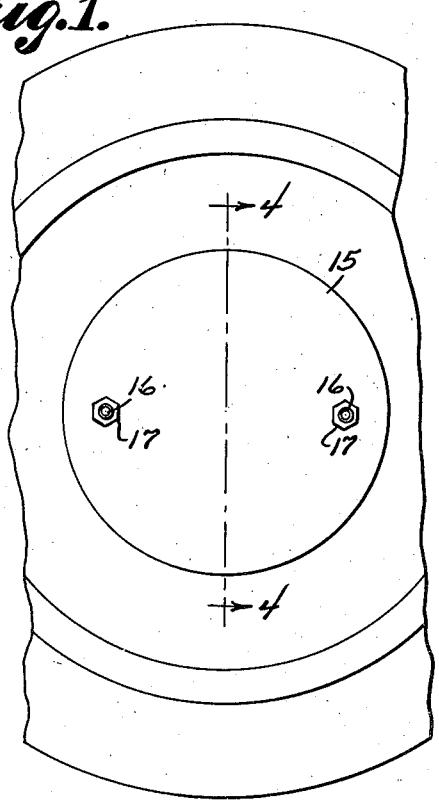
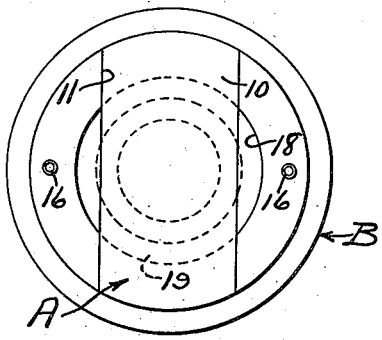
Fig. 3.
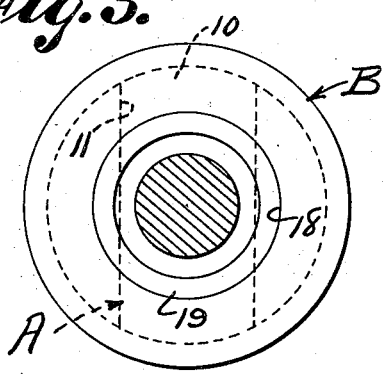
Fig. 4.
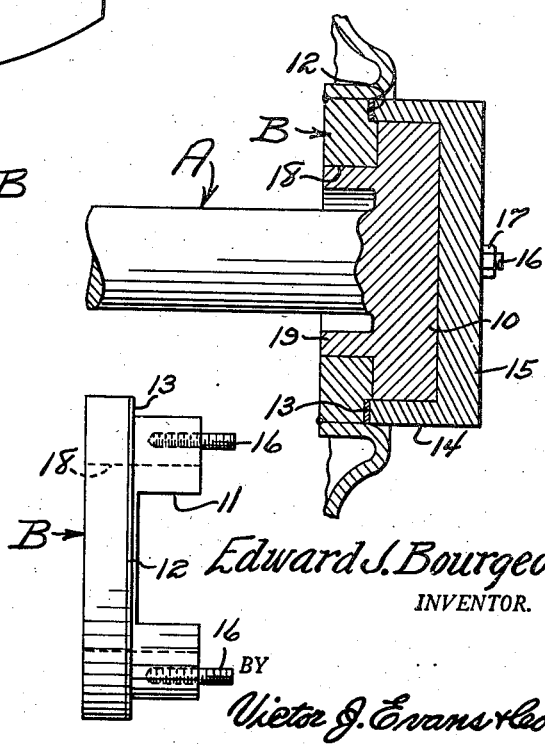
Fig. 5.
Edward J. Bourgeois
INVENTOR.
BY Victor J. Evans & Co.
ATTORNEYS Patented July 9, 1946

2,403,494

UNITED STATES PATENT OFFICE 2,403,494

REAR HUB AND AXLE ASSEMBLY FOR FLOATING AXLES

Edward J. Bourgeois, Burlington, Vt.

Application May 6, 1944, Serial No. 534,458

3 Claims. (Cl. 287—53)

The invention relates to a hub and axle connection for motor vehicles, and more particularly to rear hub and axle assembly for floating axles of motor power driven vehicles.

The primary object of the invention is the provision of an assembly of this character, wherein present day motor vehicles using floating axles, will be fastened together in a manner to eliminate much loss of time, and a reduction in labor, and in loss of essential transportation, due to broken axles, and should decrease original requirements in material, time, labor, etc., in the manufacture of hub and axle assembly.

Another object of the invention is the provision of an assembly of this character, wherein the construction thereof is unique, novel in kind, and readily and easily assembled and disassembled.

A further object of the invention is the provision of an assembly of this character, which is simple in construction, thoroughly reliable and efficient in operation, strong, durable, permitting inspection of an axle and hub with dispatch, and inexpensive to manufacture and install.

With these and other objects in view the invention consists in the features of construction, combination and arrangement of parts as will be hereinafter more fully described, illustrated in the accompanying drawing, which shows the preferred embodiment of the invention, and pointed out in the claims hereunto appended.

In the accompanying drawing:

Figure 1 is a fragmentary elevation of an axle and hub assembly constructed in accordance with the invention.

Figure 2 is an outer face view of the assembly with the grease retaining cap removed from the hub.

Figure 3 is an inner face view thereof.

Figure 4 is a sectional view taken on the line 4—4 of Figure 1 looking in the direction of the arrows.

Figure 5 is an edge elevation of the hub with the grease cap removed and detached from the axle.

Similar reference characters indicate corresponding parts throughout the several views of the drawing.

Referring to the drawing in detail A designates generally a portion of a rear floating axle of a motor vehicle of standard construction, while B is a rear hub for such axle. The axle A at its outer end is formed with a cross-head 10 of uniform width and depth, it being provided with flat parallel sides, and rounded ends, respectively.

The hub B is formed in its outer side with a countersink 11 correspondingly shaped to the cross-head 10 for accommodating the same therein for the interlocking of the axle and hub at this area. The outermost portion of the hub B is of less diameter than the innermost portion, to provide an annular shoulder 12 concentric to or circumferentially of this outermost portion, for the seating of a packing ring or gasket 13 thereagainst. Abutting this shoulder carried gasket or packing ring 13 is the rim 14 of a grease retaining cap 15, which telescopes over the cross-head 10 and the outermost portion of the hub.

Anchored in the outermost portion of the hub B, at opposite sides of the counter-sink therein, are screw bolts 16, these being passed through suitable holes in cap 15, and carry nuts 17 which function to fasten the cap in place on the said hub.

The innermost portion of the hub B has a bore 18 centrally thereof for receiving curved segmental flanges 19 formed on and projecting inwardly from the cross-head 10 of the axle A, for end thrust action upon the hub B when the said axle is driven from the motor of the vehicle, with the assembly installed therein as before described.

The housing for the rear axle A will interfit the bore 18 at the outer end of said housing, which is not shown in the drawing, and this interfit is rendered lubricant-proof in any well known manner or otherwise.

By reason of the foregoing construction in the assembly described as constituting the invention, a plurality of stud bolts now used for connecting the axle and hub together with respect to floating axles, are entirely eliminated, particularly, in the building of motor trucks or the like.

From the foregoing it is through that the construction and manner of use of the assembly will be clearly understood, and therefore, a more extended explanation has been omitted for the sake of brevity.

Changes, variations and modifications may be made in the invention as fall properly within the scope of the annexed claims, without departing from the spirit of the invention or sacrificing any of its advantages.

What is claimed is:

1. An assembly of the kind described, comprising a floating axle having a cross-head formed thereon, said cross-head having straight side walls and curved end walls, inwardly extending segmental flanges carried by the inner face of the cross-head intermediate the axle and the outer end of said cross-head, a hub having a countersink correspondingly shaped to said cross-head to receive the same, and a cap carried by the axle and engaging the hub.

2. An assembly of the kind described in claim 1, wherein the cross-head is of a diameter less than that of the hub, and said cap sealing the connection between the cross-head and the hub.

3. An assembly of the kind described in claim 1, wherein the hub has its outer face cut away at its periphery, and said cap extending therein to seal the connection between the cross-head and the hub.

EDWARD J. BOURGEOIS.